Jan. 22, 1957   K. B. BREDTSCHNEIDER ET AL   2,778,600
GATE VALVE

Filed July 5, 1952   5 Sheets-Sheet 1

Inventors.
Kurt B. Bredtschneider, &
Richard Fennema.
By Joseph O. Lange, Atty.

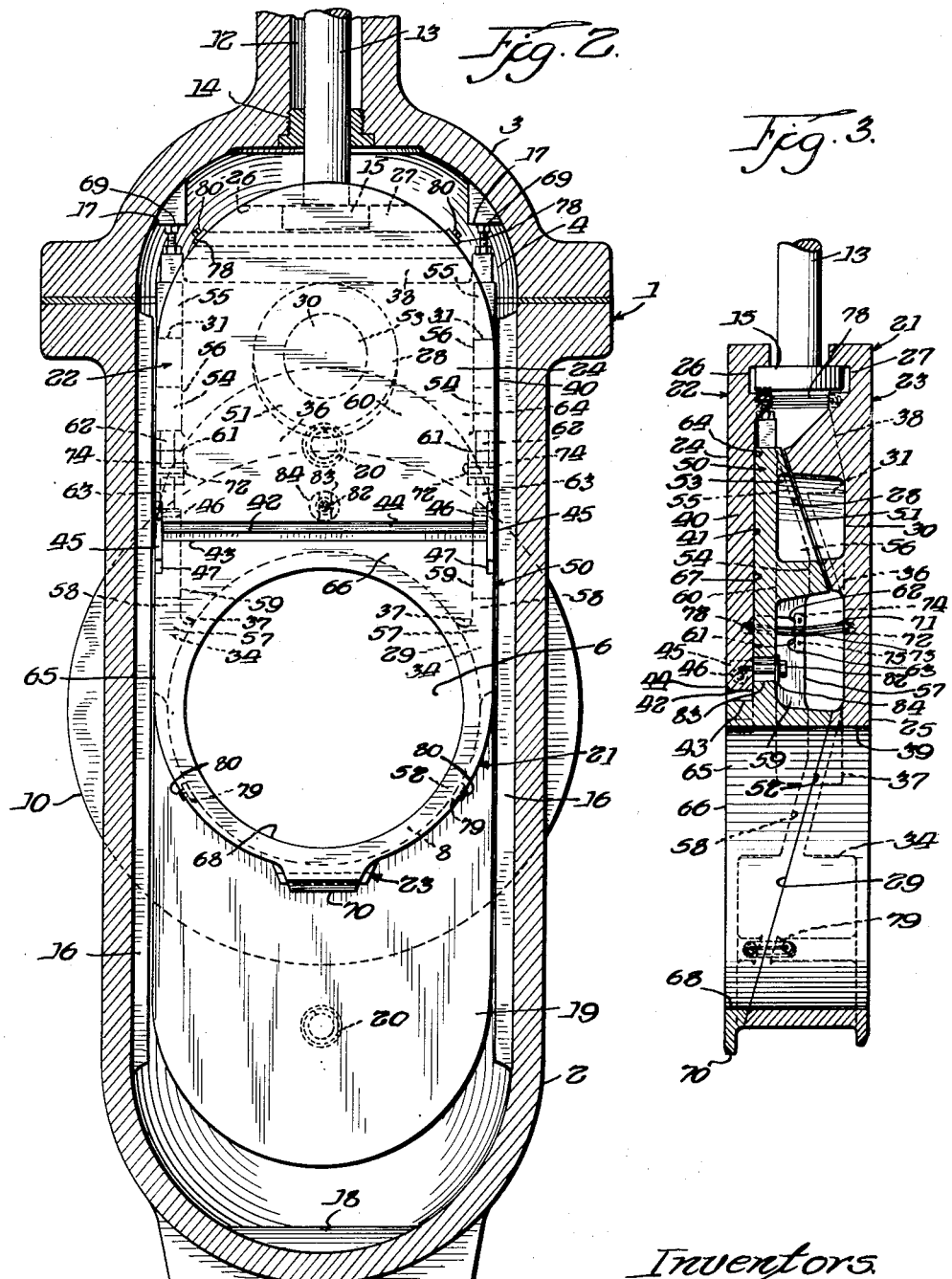

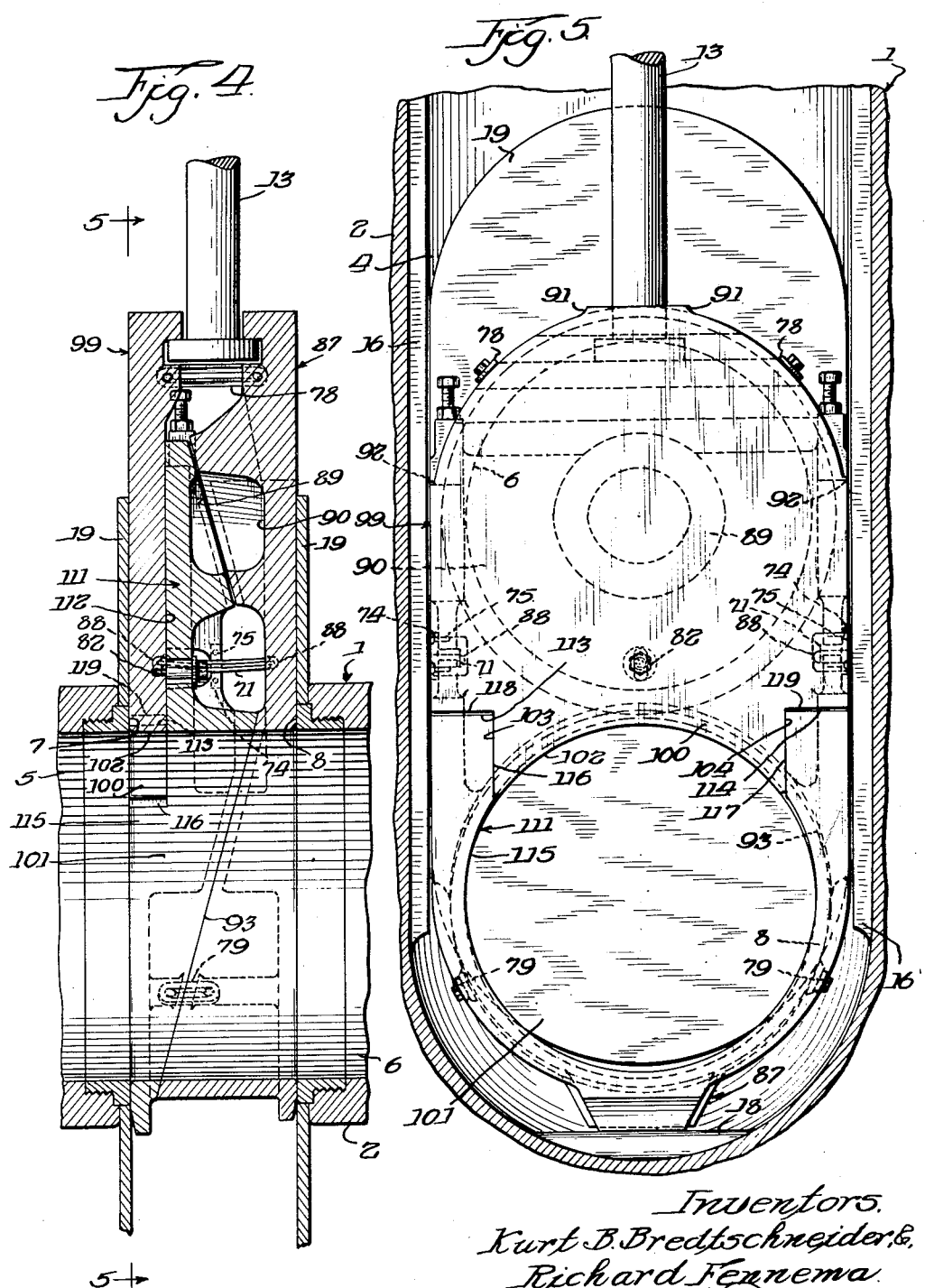

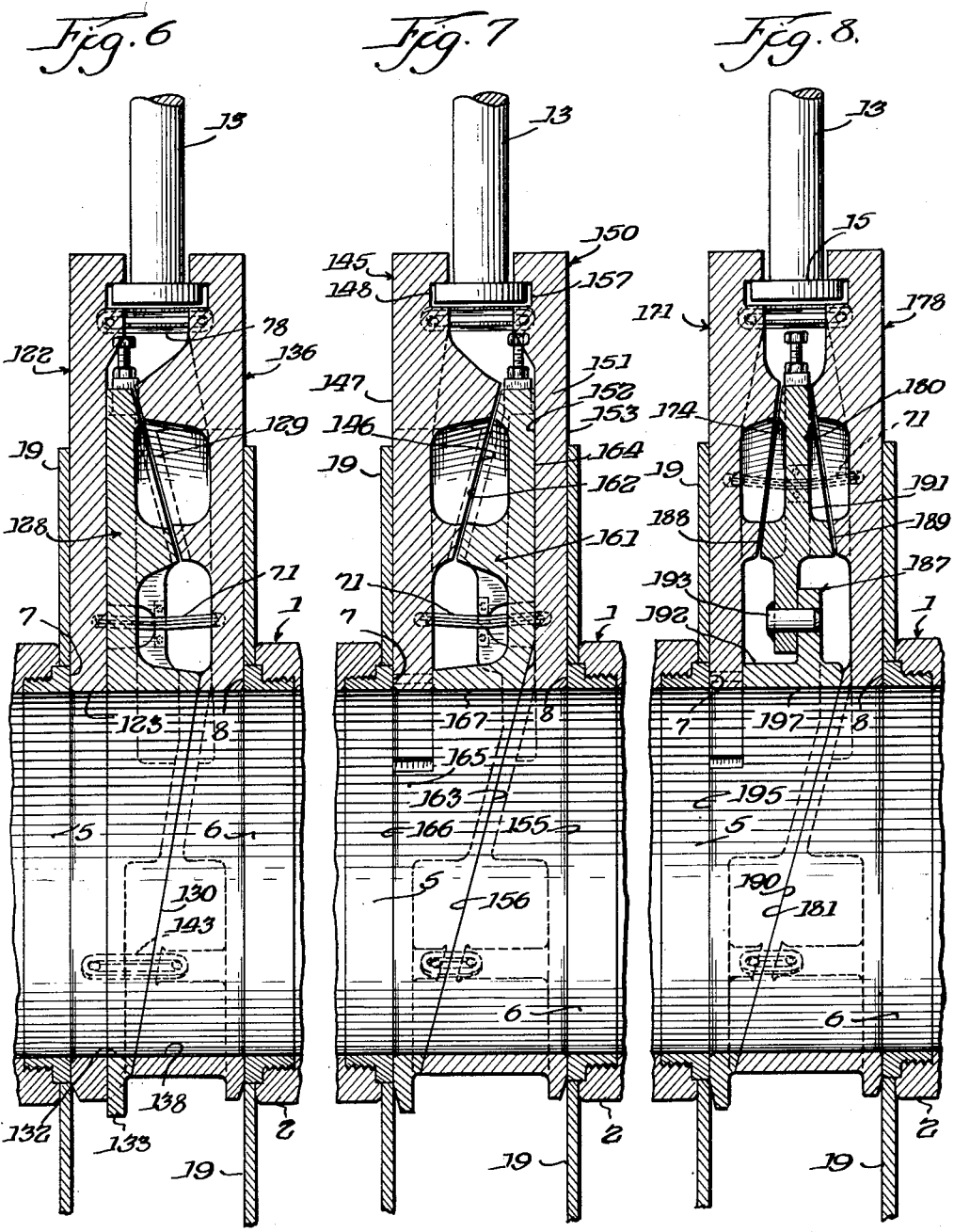

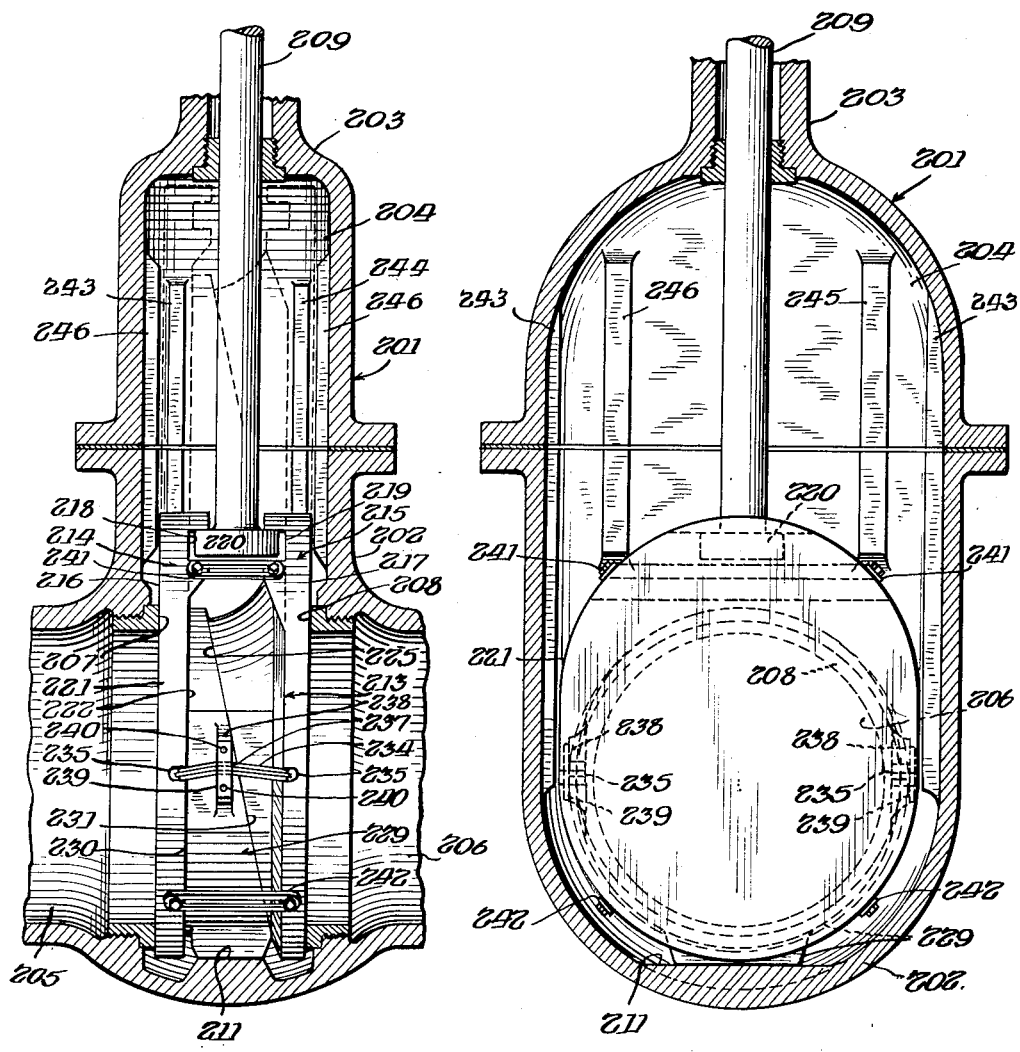

United States Patent Office 2,778,600
Patented Jan. 22, 1957

2,778,600

GATE VALVE

Kurt B. Bredtschneider and Richard Fennema, Chicago, Ill., assignors to Crane Co., Chicago, Ill., a corporation of Illinois Application July 5, 1952, Serial No. 297,328

6 Claims. (Cl. 251—196)

This invention relates generally to valves or similar closure devices, and more particularly, it is concerned with gate valves of the conduit type wherein a valve assembly is reciprocally mounted comprising outer closure members and an intermediate wedge member arranged so as to increase the thickness or gage width of the valve assembly to expand the same against spaced-apart valve seats in each extremity of travel thereof in open and closed positions.

Under certain conditions of service, it is desirable to use conduit type gate valves which will operate efficiently and effectively when under pressure from either direction. The present invention is particularly directed to a valve disc or similar closure structure having improved operation during reverse flow or line pressure.

In the two-piece valve disc structure disclosed in U. S. Patent No. 2,504,924, granted April 18, 1950, for instance, it has been found that in the cases of appreciable back pressure or line pressure from the opposite side of the closure half which is not directly connected to the valve stem and which is termed the floating half frequently drags against the valve seat under the transverse fluid load. This has a tendency to shift the floating part of the closure member with respect to the valve stem actuated part during movement of the valve assembly between the end limits thereby initiating undesired prewedging action and binding which either stops completely or impedes further movement of the assembly. Also, upon initial movement of the valve assembly from the closed valve position, there is similar drag or frictional contact which retards or prevents movement of the floating part with the stem actuated part producing binding or seizure preventing opening or satisfactory operation of the valve. According to this invention, an additional member is employed between the floating part and the valve seat against which drag occurs. In one form, this member may be essentially a flat plate set in the side of the floating part and flush therewith. Inasmuch as the greatest back pressure or reverse line pressure is exerted against the unported portion of the valve assembly when moving into and out of the closed valve position and therefore the greatest frictional resistance had with the opposite valve seat, the plate in this form extends only partly along the floating member so as to be interposed between this member and the valve seat during this appreciable loading, the plate being of such length as to effectively cover the fluid passage on that side in the closed valve condition. In another form, the plate-like member extends substantially the full length of the floating member, taking all the frictional resistance including that occurring when the valve assembly is moving into and out of the open position, which is considerably less than the friction during the opposite end movement of the valve assembly. In yet another form, the plate extends only partly along the floating member as in the first form, except that the inner face thereof is inclined for wedging action. In all of these and other forms described below, the additional plate member is connected at the top to a valve stem for positive reciprocal movement, along with the valve part on the opposite side, against frictional resistance. Drag on the floating member is thereby reduced below the critical point or entirely eliminated, depending on the form employed. Resilient means of suitable design between the closure member floating part and at least one of the stem actuated parts is sufficient to support the weight of the floating part if the valve is in a vertical position and to resist any moderate frictional drag so as to prevent prewedging, that is wedging before substantially the full open or closed positions of the valve assembly have been reached. This resilient means also serves to relieve the valve parts of their wedged condition during initial movement from the open or closed positions and to prevent binding or seizing during such initial movement.

While a valve embodying the present invention has the advantage of operating smoothly and effectively under pressure from either direction without seizing or prewedging, it is relatively simple in design and consequently easy to produce. It represents a substantial improvement over the usual two part valve disc from the standpoint of manufacturing, assembly, and operation. It is more effective and foolproof in its functioning than the more intricate prior designs as will be explained below.

Other objects and advantages will become more readily apparent upon proceeding with the specification read in light of the accompanying drawings, in which:

Fig. 2 is a sectional view taken on line 2—2 of Fig. 1.

Fig. 3 is a transverse sectional view of the valve disc or closure assembly.

Fig. 4 is a sectional view of a modified form of valve disc or closure assembly.

Fig. 5 is a view of the valve disc assembly taken on line 5—5 of Fig. 4.

Figure 1:
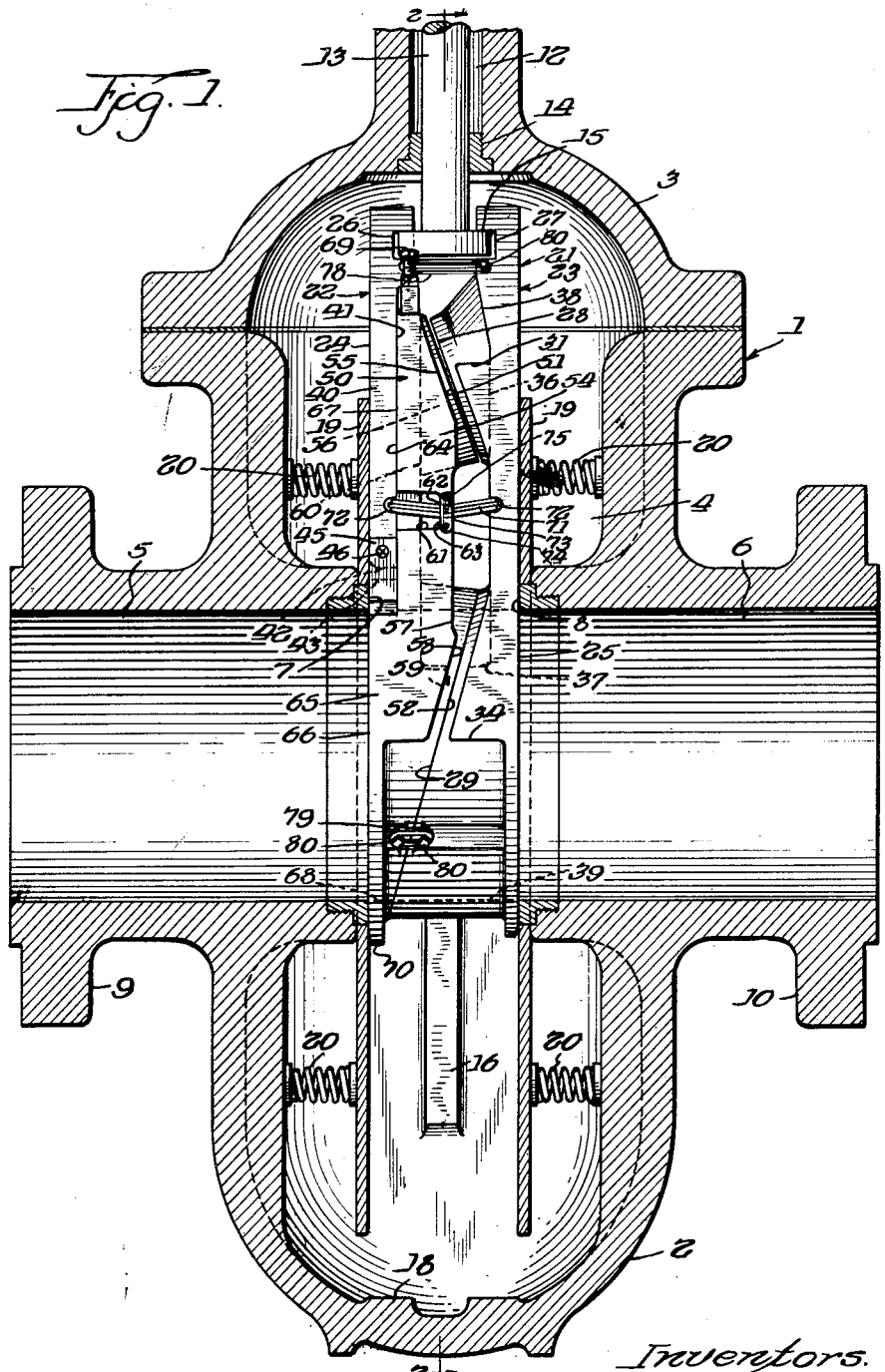
Fig. 1 is a fragmentary sectional assembly view of a conduit gate valve employing my invention.

Figs. 6, 7, and 8 are sectional views of other modified forms of valve disc assemblies.

Fig. 9 is a fragmentary sectional view of a single wedge gate valve employing our invention.

Fig. 10 is a transverse view of the structure shown in Fig. 9.

Similar reference numerals refer to similar parts throughout the several views.

Referring now to Figs. 1 through 3, the housing for the conduit type gate valve is generally designated 1 and comprises the usual valve body 2 and bonnet 3. The housing includes a valve chamber 4 extending within both the body and bonnet portions. A pair of aligned fluid inlet and outlet passages 5 and 6 communicate transversely with the valve chamber from opposite sides being provided with spaced-apart parallel annular valve seats 7 and 8 around the inner termini thereof. Although conventional screw-threaded seat rings are illustrated, it is of course apparent that integral valve seats may be employed if desired and the usual means are provided for connecting the valve to a fluid supply line as by flanges 9 and 10, for instance.

The bonnet 3, the upper part of which is shown broken for convenience of description, is connected to the valve body by any suitable means (not shown) in pressure sealing relation and includes an opening 12 for receiving a valve stem 13 which is threaded near the upper end for engagement by an internally threaded bushing (not shown) for effecting reciprocal movement upon rotation of the valve stem by means of the usual handwheel (also not shown). Interposed between the opening 12 and the valve stem is a bushing 14 for guiding the latter in its reciprocal movement. The valve stem is equipped at the lower end with a button or T-head 15 for attachment and providing the reciprocal actuation of an expansible valve disc or valve closure assembly 21 referred to as a gate. The novelty of the present invention resides particularly in the valve disc structure to be described below, the foregoing being conventional.

The valve assembly 21 comprises a pair of valve disc or closure members, generally designated 22 and 23, having flat, parallel outer surfaces 24 and 25 for engagement with valve seats 7 and 8, respectively. The closure members are preferably recessed at 26 and 27, respectively for the reception of the button or T-head 15 of the valve stem for effecting said unitary reciprocal movement of the valve disc or closure members within the valve chamber.

Intermediate the outer valve disc or closure members 22 and 23 is a wedge member generally designated 50 not connected to the valve stem but having reciprocal movement with the closure members through the use of suitable resilient supporting means such as leaf springs 71, being oppositely disposed one on each side of the valve assembly. The intermediate wedge member 50 has a flat upper and lower inclined wedge surface or face 51 and 52, respectively which lie in outwardly intersecting planes forming a convex V-shaped double wedge for sliding engagement with opposed upper and lower flat inclined wedge surfaces or faces 28 and 29, respectively on the inner side of the valve stem engaged closure member 23 lying in intersecting planes forming a generally V-shaped closure member. In the drawing, single upper and lower contact surfaces are shown which are annular or ring-like in form primarily to reduce the surface areas for wedging engagement and also to facilitate machining thereof. These surfaces, however, may be of any desired number, shape or size. For instance, opposed pairs of vertically extending machined ribs may be employed particularly as upper wedge surfaces in the intermediate and the stem actuated valve members 22 and 23 respectively.

Along each side of the intermediate member 50 and opposite the upper wedge face 51, a raised reinforcing pad 54 is provided of generally triangular configuration having an inclined upper surface 55 and vertical inner wall 56. Below these pads and spaced therefrom are lower reinforcing pads 57 also of generally triangular formation and having inclined and inner vertical surfaces 58 and 59, respectively. The lower pads are joined near the bottom to the lower wedge face 52 but are spaced therefrom at the top. Intermediate the reinforcing pads and the wedge surfaces and also between the latter is the flat surface 60 from which the pads and wedge faces are raised. The center of the upper wedge face is recessed at 53, the inner surface being in the same plane as 60. The intermediate wedge member 50 is relieved at 61 on each side to permit flexing of the leaf springs 71 which support the member at 73 through finger-like projections 62 and 63 which extend downwardly and upwardly from the spaced pads 54 and 57, respectively.

The inner side of the concave V-shaped closure member 23 is also provided with spaced upper and lower reinforcing pads 31 and 34, respectively which are of triangular shape and generally coextensive with the pads of the intermediate wedge member. Intermediate the reinforcing pads and wedge surfaces 28 and 29 and also between the latter, a flat surface 36 extends which is parallel to the outer surface 25 and from which the pads and wedge surfaces project. The latter surface extends from 37 at the bottom to the inwardly beveled surface 38 near the top, and the interior of the upper wedge face 28 is recessed at 30 so as to be in the same plane as surface 36.

Opposite the upper inclined or wedge surface 51 of the intermediate valve member is a flat, non-wedging surface or face 64 which is parallel to the flat surface 60, being in a vertical plane when the valve is installed upright and extending in any installation in the direction of and parallel to the reciprocal movement of the valve assembly. This surface or face forms one side of an upper wedge, the other side being defined by the inclined or wedge face 51.

The outer valve member 22 is essentially a flat plate having a comparatively thin plate-like depending portion 40 provided with an inner flat surface 41 which is parallel to the outer surface 24 thereof and extends in the direction of valve assembly travel for abutting relation with the parallel surface 64 of the intermediate wedge member. The outer member 22 extends only partly along the intermediate member terminating in a horizontal bottom surface 42 which is spaced from a corresponding upper surface 43 on the intermediate member to provide endwise clearance for sliding engagement of the two members along surfaces 41 and 64, respectively. The bottom of the plate-like member 22 may be either of convex or semi-circular form, if desired, rather than straight across or horizontal, but it is necessary that the member extend sufficiently to effectively provide a closed fluid passage 5 when the valve assembly is in its extreme lower position. It is preferable that surface 43 conform to surface 42 whatever form it may take. In the form shown, the lower surface 42 of the valve member 22 has been chamfered or beveled at 44 so as to cam the closure member inwardly as it is being lowered to avoid injury to the top of the valve seat 7 should the closure member move beyond the plane of the valve seat when in the open position. This is particularly advisable if the holding screw 82 is not used. Also, a thin plate 45 has been provided at each side to cover the ends of the clearance and thus reduce the loss of grease from the interior of the valve to the conduit or fluid line. These plates are secured to the closure member 22 by suitable means as by countersink screws 46 and are recessed in both the closure and wedge members 22 and 50 at 47 so as to be flush with the edges of these members. This is desirable so as not to obstruct guiding contact thereof within the valve chamber if a pair of guide ribs are desired along the sides instead of the single centrally positioned member 16 shown. Clearance is also provided at the bottom of these plates to permit the sliding movement between these members related above.

It will be noted that the lower portion of the intermediate wedge member 50 extends transversely to one side at 65 and has an outer surface 66 which is flat and parallel to valve assembly travel. It extends complementary to and in line with the outer surface 24 of the plate-like valve disc member 22 thereabove. The extensions 65 with its flat upper surface 43 in effect produces a recess at 67 for the reception of the plate-like valve disc or closure member 22 which is set in what would otherwise be the outer closure surface of a floating valve member having reciprocal movement through a valve stem engaged closure member, in this case 23.

Valve disc member 23 and the intermediate or floating member 50 are transversely ported through the lower wedge surfaces 29 and 52, respectively and also through the outer parallel surfaces 25 and 66, respectively at 39 and 68 for registry with the body fluid passages 5 and 6 in the open valve position of the valve assembly.

The valve assembly 21 is laterally contained in its reciprocatory travel by spaced longitudinally or vertically disposed guides 16 within the valve chamber 4. Upper and lower abutment surfaces 17 and 18 respectively are also provided for endwise limiting of the valve assembly in each direction of reciprocal travel by contact therewith of upper and lower stop member 69 and 70, respectively of the intermediate wedge member 50. The upper stops 69 are preferably adjustable for the purpose of lining up ports 39 and 68 with each other and also with fluid passages 5 and 6 in the valve body 2 in the expanded and open valve condition. However, non-adjustable, machined stops may be used if desired. A pair of oppositely disposed wiping plates 19, resiliently mounted to the valve body as by coil springs 20 are also preferably employed when the interior of the valve is grease filled to keep the outer seating surfaces 24, 25, and 66 clean and free from foreign material. These members further tend to collapse the valve assembly upon movement of the assembly away from either extreme position and also keep it in vertical alignment within the valve chamber, but may be dispensed with for certain purposes.

Although not necessary to the operation of the valve, upper and lower slotted links 78 and 79 are provided at each side of the valve assembly to hold the members thereof loosely together while being lowered into or raised from the valve body to facilitate assembly or disassembly. The links are mounted on spaced-apart cap screws 80 and permit the necessary spreading of the valve members during expansion in the open and closed positions. In lieu of additional links between the wedge member 50 and the plate-like closure member 22 at the bottom thereof particularly since the spring mounting is at this location, a single screw 82 (see Figs. 2 and 3) is employed at the center. The latter element is threaded into the plate-like closure member 22 and extends through the bore 83 in the wedge member, being retained thereon by means of a washer 84 which permits limited relative sliding of the two members.

In operation, fluid passages 5 and 6 may be considered to be the usual inlet and outlet ports, respectively. Upon rotation of the handwheel at the upper end of the valve stem 13, the outer closure or valve disc members 22 and 23 are raised or lowered depending upon the direction of rotation within the valve chamber. The intermediate wedge member 50 rides or floats along with the outer members during upward or downward movement of the same. This riding or floating is occasioned primarily by leaf springs 71 which are supported at each end by the outer members in recesses 72 and which in turn support the intermediate member at 73 through the upper and lower finger-like projections 62 and 63 respectively which extend towards each other in spaced relation at each side of the intermediate member 50. The springs are retained in their recessed position by means of the cover plates 74 attached by screws 75. To some extent, the inclined surfaces 28 and 29 of the outer valve member 23 exert a downwardly and upward force, respectively on surfaces 51 and 52 of the intermediate member. Although these forces alone would be sufficient to carry the intermediate member with it, the transverse component tends to set up a wedging action, spreading the outer valve members against the valve seats impeding or preventing movement of the valve assembly and causing excessive wear and damage to the internal structure. Resilient supporting means such as leaf springs 71 are therefore necessary to support the weight of the intermediate member in a vertical installation and to overcome drag or frictional resistance in any installation so as to substantially eliminate these forces during movement of the valve assembly between the end positions. The supporting means also positions the intermediate and at least the V-shaped closure member with respect to each other. This arrangement permits a reduced gage width or collapsed condition which is the normal condition of the valve assembly between the end limits of travel. In this condition, the upper and lower wedge faces of the intermediate and V-shaped closure members as at 28 and 51 and at 29 and 52 respectively are normally in light contact with each other, the springs 71 taking the carrying load under these circumstances.

When the upper and lower movements of the valve assembly are nearly complete, the intermediate wedge member 50 makes contact with the upper and lower abutments 17 and 18, respectively through its upper and lower stops 69 and 70. With the movement of the floating wedge member thus arrested, the outer valve disc or closure members 22 and 23 continue to be raised or lowered, respectively against the action of springs 71 until the lower inclined surfaces 29 and 52 and the upper inclined surfaces 28 and 51, in the respective movements have expanded the valve assembly transversely within the valve chamber in the extreme upper and lower positions thereof in substantially sealed open and closed engagement, respectively with the spaced-apart valve seats 7 and 8.

During expansion in the downward movement of the assembly, the intermediate wedge member with its upper inclined surface 51 is in effect moved between the outer members upwardly to wedge the latter members outwardly or transversely in the closed valve position. During this action, the transverse wedging force is initiated by the sliding engagement of surfaces 28 and 51 with each other, which force is transmitted directly to closure member 23 by this wedging action and indirectly to the plate-like closure member 22 through the non-wedging, sliding engagement of surfaces 41 and 64 normal or at right angles to the transverse expansion. Expansion in the upward movement of the valve assembly is the result of relative sliding movement of the intermediate and outer valve members 50 and 23, along lower inclined or wedge surfaces 52 and 29, respectively which bring outer parallel surfaces 25 and 66 into expansive engagement with the spaced valve seats 8 and 7 respectively in the open valve condition. Figs. 1 to 3 inclusive show the valve and the disc or closure assembly therein in the expanded open valve condition with the ports 39 and 68 in registry with body fluid passages 5 and 6. It should be noted that the lower inclined surfaces 29 and 52 are in close force imparting contact with each other while the upper surfaces 28 and 51 are out of engagement and ordinarily slightly spaced from each other. In the expanded closed valve position, the engagement is between the upper wedge surfaces 28 and 51 and the slight spacing between lower surfaces 29 and 52.

When the direction of rotation of the handwheel is reversed and the valve closure assembly is initially moved in the opposite direction, the intermediate wedge member remains momentarily in contact with the upper and lower abutments respectively under relatively great loading of the springs 71, while the outer member 23 is moved slightly by the valve stem, thus relieving and releasing the wedged surfaces and permitting contraction or collapse of the said valve assembly for free movement thereof within the valve. Upon springs 71 returning to their neutral, substantially straight, unstressed condition and with the floating and outer valve members 50 and 23 returning to a substantially neutral position with respect to each other. The valve assembly upon actuation travels as a unit away from the abutment until the opposite abutment is reached.

It is necessary in order to prevent seizure or binding of the inclined surfaces when in wedged condition and to effect release of the same and free sliding engagement in the direction of collapse that the angle of inclination thereof with respect to valve assembly travel not be too acute. Best overall results are obtained when an angle of inclination of the order of from 18° to 22° is used for all inclined surfaces, although the upper and lower wedge surfaces need not be of exactly the same angularity. In fact, it is preferable to have the lower surfaces of slightly greater inclination than the upper ones, the thickness of the valve assembly permitting, in order to reduce the wedging force available in the open valve position which requires much less force than for the sealed and closed position. Also in some instances, it may be desired to increase the angle of inclination sufficiently to produce a valve assembly which will collapse without the assistance of springs, the valve parts releasing or sliding freely to the collapsed position merely upon withdrawal of the wedging force. The angle necessary for this result, however, would require an exceptionally thick valve assembly and consequently a larger and heavier housing. It has been found, however, in this connection that the resiliently mounted wiping plate 19 shown on the left in Fig. 1 assists in the collapse of the valve assembly by tending to hold the intermediate member from movement along with the outer members by virtue of its bearing on outer surface 66. The springs 71 could be reduced in size or the wedge angle reduced somewhat if the loading of the wiping plates were increased by heavier springs 20. This would assist in reducing the width of the valve assembly or possibly eliminating the springs 71.

It should be noted that the lower wedge surfaces 29 and 52 are of considerably greater height than the upper surfaces 28 and 51 because of the relatively large fluid ports therethrough, and in order to have the preferred inclination of from 18 to 22 degrees substantially the entire thickness of the valve assembly is used. The remaining thickness is necessary to provide for lower stop 70 and to preserve a minimum thickness of the lower part of the intermediate wedge member 50 to prevent buckling or distortion thereof when the outer surface 66 is in seating engagement in the open valve condition.

The upper wedge surfaces 28 and 51 do not require this thickness for proper operation since they are of less height. Also, when back pressure or reverse line pressure is directed against the outer surface 25 of the valve disc member 23 when moving into or out of the closed valve position, the valve assembly is forced against the opposite side of the valve chamber with considerable load. This results in the case of the two part valve structure referred to above in appreciable frictional drag which interferes with smooth movement of the valve assembly and often sets up the undesired prewedging action or causes binding or locking in the closed position when the valve is initially moved towards the open position. To avoid this difficulty when the upper closure portion of surface 25 is exposed to back pressure or is moving in the stream of reverse line pressure, the additional part 22 has been inserted in the outer wall of the intermediate or floating member 50, being connected at the top to the valve stem 13. This part is opposite the upper closure portion of surface 25 and receives the fluid loading therefrom to relieve the floating member of the frictional drag with valve seat 7 due to this load. When the valve members are in the closed and wedged condition, there is also the additional static friction due to the transverse expanding force to be overcome in initial movement towards the open position. In the present arrangement, rotation of the handwheel also actuates part 22 forcing it in positive movement against the combined high frictional resistance. When the valve assembly is being initially moved towards the open position, there is additional friction to be overcome by the sliding movement of valve member 22, along with outer valve member 23, over the intermediate or floating valve member 50 which remains against the lower abutment 18 under the action of springs 71 until the transverse expanding or wedging force is eliminated and the valve assembly is substantially collapsed and moving freely.

When the fluid ports 39 and 68 are being moved into or out of registry with the fluid passages 6 and 5 in the valve body for the open valve condition, on the other hand, the back pressure or reverse line pressure which is directed against the outer surface 25 of the valve member 23 does not load the intermediate member 50 sufficiently to cause appreciable drag. Ordinarily, it is therefore unnecessary to extend the plate-like valve member 22 the entire height or length of the intermediate member to relieve it of all drag. It is apparent that substantially the full thickness of the valve assembly is available for the lower wedge surfaces 29 and 52 and that the additional valve part or plate-like member 22 can be provided opposite the upper wedge surfaces 28 and 51 where it is needed since the latter require much less thickness. Great utilization of space and good design is therefore provided.

It is readily apparent that a valve disc assembly has been produced which is both easy to make since there is only one set of upper and lower inclined or wedge surfaces to machine and compact and efficient in design. The structure is moreover fully operable in either direction of line pressure or during appreciable back pressure and yet is much simpler than the other valves of this type presently known.

Another advantage of the instant structure is that only two valve parts or members are ported for registry with the fluid passages in the valve body instead of the usual three or more providing port registry and smoother fluid flow or easier adjustment of the same where upper stop adjustment is present and also the elimination of one or more of the usual joints between valve parts, making a tighter connection and reducing loss of internal lubricant into the fluid line or of fluid pressure into the interior of the valve.

Although fluid pressure assists in the collapse or release of valve members from their wedged condition, it is by no means essential and the valve will operate satisfactorily on slight flow as well as when there is substantial fluid flow in the conduit or line.

A further advantage is that the valve will operate effectively and smoothly should the closure assembly inadvertently be turned around and mounted in the reverse position in valve casing. In fact, reversal of the assembly after appreciable wear begins to appear should considerably prolong the life of the various parts before replacement thereof is necessary.

Thus, it is clear that a simple, and effective valve has been provided, and while the description has been directed to a certain embodiment, it should be understood that the basic concepts are applicable to other forms of the valve.

For example, referring now to Figs. 4 and 5, a slightly different valve assembly is illustrated for use in the same valve housing previously described and shown in Figs. 1 and 2 of the drawing. A generally concave V-shaped closure or valve disc member 87 is employed which is the same as closure member 23 of the Fig. 1 form except for such minor variations as a slightly lower leaf spring mounting at 88, an upper wedge face 89 which is raised a little further from the flat intermediate surface 90 and slight offsets at the top at 91 and 92. The latter member is engaged at the top by the valve stem 13 and in the same manner as previously described. The opposite plate-like valve disc or closure member 99 is also engaged at the top by the valve stem 13 and is similar in mounting to member 22 of the Fig. 1 form except that it extends or depends farther along the intermediate or floating wedge member 111 in the interior or recess at 100 so as to remain in contact with the valve seat 7 of the valve body at all times, thus preventing the member from moving beyond the plane of the valve seat in the upper or open position, particularly where the links 78 and 79 and the positioning screw 82 are not employed. Also, the member is held in position alongside the intermediate member 111 eliminating any tendency for excess grease to work between the members requiring additional force to be squeezed out during the closing operation.

It should be noted that the lower interior or middle portion 100 of the flat, plate-like member 99 as seen in Fig. 5 borders on the port or fluid passage 101 through the valve assembly having an arcuate lower edge or bottom surface 102 forming part of the cylindrical wall of the port. The valve members are adjusted so that in the expanded open valve condition this surface 102 is in alignment with the rest of the inner surface of the port and also with the passages 5 and 6 in the valve body, for non-turbulent fluid flow. It should also be noted that the lower portion of the plate-like closure member is cut out at each side being bounded by vertical surfaces 103, 104 and horizontal surfaces 118, 119, respectively.

The intermediate wedge member 111 is substantially the same as member 50 of Fig. 1 except that the recess at 112 for the reception of the plate-like member 99 extends down in the interior or center to the port 101 therethrough to provide for the depending center portion 100 of the platelike valve member 99. At each side, however, the recess stops short of the port 101 in flat, horizontal surfaces 113 and 114 forming spaced apart upper faces of a lower transversely extending portion 115 of the intermediate or floating member 111 equivalent to portion 65 of Fig. 1. Vertical surfaces 116 and 117 define inner boundaries of the extending portion 115 which is essentially U-shaped when viewed as in Fig. 5, the walls of the fluid port forming the bottom of the U. The upper part of the U at each side defined by surfaces 113, 116, and 114, 117, respectively form projections which fit into the cutout portions at each side of the plate-like closure member. Surfaces 116 and 117 are machined flat for close fitting sliding engagement with surfaces 103 and 104 of the plate-like member 99 which are also machined flat. Ample clearance is provided between the horizontal surfaces 113, 118, and 114, 119 of the members, respectively to permit relative movement between the members during wedging or expansion in the closed valve condition.

The offset or stepped nature of the bottom of the plate-like valve disc member provides in cooperation with the closely fitting projecting or extending portions of the intermediate valve member an effective seal to prevent more than a minimum loss of lubricating grease into the fluid line or of fluid pressure into the interior of the valve.

In operation, this form of the valve functions in exactly the same manner as that of Fig. 1, except for the lower valve seat contacting portion 100 of the outer plate-like closure member and the offset grease seal explained above, and includes similar upper and lower wedge surfaces at 89 and 93 respectively and supporting or positioning springs 71.

It should be noted that Fig. 4 shows the valve assembly in the upper expanded open valve condition as did Figs. 1–3, but that Fig. 5 illustrates the assembly in the lower extreme position to portray the relation of the parts in the expanded closed valve condition. This relation is similar in all forms of the conduit type valve herein disclosed.

Fig. 6 shows substantially the same valve assembly as do Figs. 1 and 4, except that the outer plate-like valve disc or closure member 122 shown at the left extends substantially the full height or length of the intermediate wedge member 128 to entirely eliminate frictional drag on that member occasioned by sliding engagement with valve seat 7, producing a full three piece valve assembly. The extended plate-like valve member 122 is ported at 123 for registry with ports 132 and 138 in the intermediate and outer valve disc members 128 and 136, respectively in the expanded open valve condition as shown in Fig. 6. The intermediate wedge member has a lower stop 133 for contact with a corresponding abutment in the valve body for the same purpose as explained in connection with Figs. 1 to 3 inclusive. Upper and lower wedge surfaces at 129 and 130, respectively effect the wedging or spreading of the outer valve members 122 and 136 in both the open and closed positions at each extremity of valve assembly travel. Valve stem 13 engages both of the outer members for unitary reciprocal movement thereof. Leaf springs 71, one on each side, carry the intermediate or floating wedge member 128 along in similar movement and serve the same releasing function and as shown are mounted in the same manner as disclosed for the Fig. 1 form. The positioning screw 82 has been omitted as the upper and lower links 78 and 143 are sufficient for purpose of assemblage and the plate-like valve member 122 remains in contact with valve seat 7 at all times.

In the above forms, the outer valve disc or closure members 22, 99, and 122, respectively shown at the left in Figs. 1, 4, and 6 have flat parallel inner surfaces or faces for non-wedging sliding engagement with the intermediate wedge members 50, 111, and 128, respectively. It is not of course necessary that the straight or non-wedging faces be positioned on the left side as shown in Figs. 1 and 4 for instance, but they may be on the right between the intermediate or floating member and the fully extending outer member if desired, for easier machining and fabrication for instance. Accordingly, the partly extending member shown on the left may be inclined or tapered on the inside and the member shown on the right straight or uninclined on the inner surface opposite thereto.

Fig. 7 shows a valve assembly so constructed. In this figure, the partly extending valve disc or closure member 145 is substantially wedge shaped having inner and outer flat surfaces or faces 146 and 147, respectively, the inner one being inclined to valve assembly travel and the outer one being vertical and parallel to said travel. The closure member 150 on the opposite side includes a flat plate-like portion at 151 having parallel inner and outer surfaces or faces 152 and 153, respectively which are also normally parallel to the outer surface 147 of the disc member 145 and to valve assembly travel. The outer flat surface of closure member 150 extends downwardly at 155 for contact with valve seat 8 in the open expanded valve condition. Opposite this lower part of the outer flat surface is an inclined or wedge surface 156. Both of the outer valve disc members are connected at the top by means of recesses 148 and 157 to rising valve stem 13 for unitary reciprocal movement within the valve chamber as described in connection with the Fig. 1 form.

The intermediate or floating valve member 161 has upper and lower inclined wedge surfaces 162 and 163, respectively, but unlike the above described forms these surfaces or faces are placed on opposite sides for wedging cooperation with the inclined surfaces 146 and 156 of outer valve members 145 and 150, respectively. Opposite the upper wedge surface 162 is a flat surface or face 164 which is vertical and parallel to valve assembly travel for expansive cooperation with the uninclined or vertical inner surface 152 of the outer stem engaged valve member 150. The intermediate or floating wedge member also has a transversely extending portion at 165 which has an outer flat surface 166 for seating engagement with the valve seat 7 in the expanded open condition, said position being illustrated in Fig. 7. This face is normally flush and in line with the outer surface 147 of the valve disc or closure member 145 and parallel to the upper, uninclined surface 164 of the intermediate wedge member 161. Both the intermediate and fully extending outer valve members are ported at 167 for registry with the usual fluid passages 5 and 6 in the valve body. The outer member 145 extends only partly along the intermediate member and may terminate horizontally straight across or in a stepped formation as in the embodiments of Figs. 1 and 4, respectively. Fig. 7 indicates the Fig. 4 arrangement.

This embodiment operates substantially the same as the Figs. 1 and 4 forms and includes oppositely disposed leaf springs 71 mounted and functioning in the same way.

The valve assembly of Fig. 8 is similar to that of the last embodiment, the intermediate wedge member 187 having an outer seating surface at 195 and the partly extending valve disc or closure member 171 being substantially wedge shaped having an inclined or tapered inner surface 174. In this form, however, the intermediate member has been provided with oppositely disposed upper inclined wedge surfaces 188 and 189 for greater wedging or expansive force in the closed valve position, if desired. These surfaces cooperate with inwardly facing inclined surfaces 174 and 180, of the outer closure or valve disc members 171 and 178, respectively during such expansion. The intermediate or wedge member 187 has a lower inclined surface 190 for sliding engagement with the lower wedge surface 181 of the outer valve member 178. The two valve members are ported at 197 for registry with fluid passages 5 and 6 in the valve body 2 in the expanded open valve position. To facilitate manufacture, the intermediate or floating wedge member 187 comprises separate upper and lower parts 191 and 192, respectively which are machined and then attached by suitable means as by pins 193 (only one being shown) for unitary reciprocal movement. The lower portion of the outer valve member 171 may also be horizontally straight across at the bottom or stepped as in the Fig. 1 and 4 forms, respectively. Fig. 8 indicates the Fig. 4 arrangement. This assembly is actuated in reciprocal movement by rising valve stem 13, being provided with oppositely disposed leaf springs 71 (only one being shown) for support of the intermediate member 187 and operating in substantially the same manner as described in connection with Figs. 1 and 4.

It should be understood that the intermediate member 187 may be of one piece construction, if desired, or the outer valve member 178 of two or more pieces for connection by means of pins or otherwise for unitary reciprocal movement. Or, both the intermediate and outer members may be comprised of a plurality of parts. In the multiple part members, flexibility is present which may be desirable for proper wedging and seating. For this matter, multiple part construction may be employed in the other forms previously covered, if desired.

The foregoing description has pertained to conduit type gate valves, but it should be evident that the principles of the invention are applicable to other kinds of valves, as for instance, a single wedge valve operable to expand in the closed valve condition and to entirely withdraw from the line of fluid flow in the open condition, expansion of the valve assembly being in the closed position only.

Figs. 9 and 10 illustrate such a valve in which 201 is the valve housing comprising a body 202 and bonnet 203 mounted thereon in the usual manner and including a valve chamber 204. Fluid passages 205 and 206 are provided in the valve body communicating transversely with the valve chamber from opposite sides and including spaced, flat parallel annular or ring-like valve seats 207 and 208 at the inner termini thereof. A rising valve stem 209 extends into the valve chamber through the bonnet at one end thereof, the upper part of the bonnet being shown broken and the threaded engagement with the valve stem being omitted for convenience of illustration. The bottom of the valve chamber is provided with an abutment surface at 211 while pairs of oppositely disposed ribs or raised surfaces 243, 244, 245, and 246 extend vertically or longitudinally within the valve chamber to position and guide the expansible valve assembly 213 as it travels in reciprocal movement within the valve chamber.

The valve assembly comprises a pair of outer valve disc or closure members 214 and 215 having flat, parallel outer surfaces or faces 216 and 217 for seating contact with valve seats 207 and 208, respectively in the expanded closed valve condition shown in full lines in Figs. 9 and 10 of the drawing. The closure members are recessed at 218 and 219, respectively for reciprocal engagement by the enlarged lower end or T head 220 of the valve stem 209. Closure member 214 has a depending flat, plate-like portion 221 having an inner face or surface 222 which is parallel to the outer or closure surface 216 and also to reciprocal valve assembly travel. Closure member 215 is wedge shaped, having an inner inclined or tapered flat surface 225 opposite the outer parallel face 217. The intermediate valve member 229 is also wedge shaped, having a flat surface 230 on one side which is parallel to valve assembly travel for sliding engagement with the inner parallel surface 222 of the plate-like valve member 214 and an inclined wedge surface 231 on the opposite side for engagement with the inner inclined surface 225 of the outer valve disc member 215. The intermediate wedge member is carried along with the outer valve stem engaged members in reciprocal movement therewith through a pair of oppositely disposed leaf springs 234, one on each side, spanning between the outer members 214 and 215 from recesses 235 and supporting the inner wedge member in a groove 237 in boss or projection 238. Cover plates 239 secured by screws 240 are provided to retain the springs during assembly and disassembly. Links 241 and 242 are also provided to hold the valve members loosely together at this time. It should be noted that the spring mounting in the intermediate member is somewhat different from the mounting disclosed for the previous embodiments. The present arrangement or others may be employed in those embodiments, however, if desired.

This embodiment functions substantially the same as the above described forms for the closing operation, the intermediate member 229 contacting the abutment surface 211 and the outer closure members continuing slightly further in downward movement to be spread transversely within the valve chamber against the spaced valve seats 207 and 208 by the wedge member 229 in substantially closed sealed valve condition. Leaf springs 234 are deflected slightly during the expansion process and effect relief and release of the wedged surfaces 225 and 231 during the initial opening movement of the valve assembly in same manner previously described in connection with the Fig. 1 form. The inclined surfaces 225 and 231 have been shown solid across the height or length and breadth of the valve members. These surfaces may, of course, be raised or relieved as in the above embodiments, if desired. It is preferable, however, whether relieved or solid, that these and also the uninclined surfaces extend substantially the entire height or length of the valve assembly for best performance. The open valve position has been indicated in dotted lines in Fig. 9.

While the drawings have illustrated the various embodiments in the vertical position, it should, of course, be understood that the valves shown can operate positively and effectively in any position including an inverted position, by virtue of the resilient positioning means or springs which not only release the valve members when in the expanded conditions, but also are preferably ample to overcome the weight of the intermediate wedge member in the vertical position and frictional drag when in any position. The valve assemblies and the valve members thereof have therefore been referred to in the foregoing specification as having height or length, which are here to be considered as synonymous.

Thus, a gate valve, whether in the form of a single wedge or a double wedge having upper and lower inclined surfaces, has been provided which has positive release from the wedged condition of the valve assembly in all service conditions and positions of use insuring efficient and smooth operation, particularly while under appreciable back pressure or reverse line pressure.

Although the resilient positioning means or springs are shown and described as spanning between the outer valve disc or closure members and supporting therebetween the intermediate or floating wedge member, the resilient means or springs may extend only between the outer valve member having one or more inclined wedge surfaces and the intermediate or floating member, to support and position the latter in cantilever arrangement from said outer member. Also, a plain, lever actuated rising stem or a non-rising stem or a non-rising valve stem may be employed, if desired, rather than the rotating screw-type of rising valve stem, herein described.

The description of the various embodiments and the drawing figures relating thereto have depicted spaced, flat parallel valve seats and valve assemblies having flat, parallel outer surfaces and flat inclined and uninclined inner surfaces. It should be understood, however, that a cylindrical-shaped valve assembly with straight, parallel outer surfaces cooperating with similarly shaped valve seats and with flat or cylindrical or otherwise curved inner surfaces which are inclined and extend parallel to valve assembly travel, respectively are within the scope and spirit of the present invention. Also, the valve seats and outer walls of the valve assembly need not necessarily be straight or parallel but may be convergent for instance, particularly in the case of a single wedge gate valve.

Although the word "valve" has been used singly and in combination to nominate and describe the invention and the constituent parts of the various forms, the term is intended to include generically closure devices in which there is a flow of material, the word "fluid" also used in the specification and claims referring to the flow of solid bulk material as well as to liquid and vapor.

Thus, while several embodiments of the invention have been shown and described, it should, of course, be apparent that other variations and embodiments are possible and are to be considered within the spirit and scope of this contribution as measured by the appended claims.

We claim:

1. In a valve having a housing including a valve chamber and a pair of fluid passages communicating transversely therewith from opposite sides and provided with spaced parallel valve seats around the inner termini of said fluid passages, an expansible valve assembly reciprocally mounted within said valve chamber and comprising a pair of closure members having parallel outer surfaces for seating contact with said valve seats and a member intermediate said closure members having upper and lower wedge surface means cooperating with at least one of said closure members for effecting transverse expansion of said valve assembly against said valve seats in open and closed positions at substantially each extremity of travel thereof, one of said closure members extending only partly along said intermediate member, said intermediate member having a lower portion extending transversely to one side, said latter portion having an outer surface for contact with one of said valve seats in substantially the open expanded valve condition, said outer surface being normally flush and in line with the outer seating surface of said partly extending closure member thereabove, stop means and abutment surfaces therefor within the valve chamber cooperating with the said intermediate member at end limits of closure member travel whereby at each of said limits of the valve assembly travel the said intermediate member is moved into engagement with the said closure elements, means for actuating the said valve assembly, resilient means comprising leaf springs for supporting and positioning said intermediate member and at least one of said closure members relative to each other during the travel of the valve assembly between the end limits of reciprocal movement thereof to maintain the closure and wedge members in substantially the same plane and thereby prevent substantial transverse expansion of said valve assembly during such movement.

2. In a valve having a housing including a valve chamber and a pair of fluid passages communicating transversely therewith from opposite sides and provided with spaced parallel valve seats around the inner termini of said fluid passages, an expansible valve assembly reciprocally mounted within said valve chamber and comprising a pair of closure members having parallel outer surfaces for seating contact with said valve seats and a member intermediate said closure members having upper and lower wedge surface means cooperating with at least one of said closure members for effecting transverse expansion of said valve assembly against said valve seats in open and closed positions at substantially each extremity of travel thereof, stop means and abutment surfaces therefor within the valve chamber cooperating with the said intermediate member for said valve assembly expansion, one of said closure members extending for at least a portion of its length along said intermediate member, said intermediate member having side surfaces with a lower portion of said intermediate member extending transversely to said side surfaces, said lower portion having an outer surface for contact with one of said valve seats in substantially the open expanded valve condition, said outer surface lying normally flush and complementary to the outer seating surface of said partly extending closure member thereabove, means for reciprocally moving the said valve assembly, leaf spring spanning means engaging said side surfaces of said intermediate member and at least one of said closure members during substantially the entire travel of the valve assembly between the end limits of reciprocal movement of the valve thereby to align and support the said closure members and the intermediate member and inhibit transverse expansion of said valve assembly during such movement.

3. In a valve having a body with spaced valve seats, an expansible valve assembly reciprocally mounted for movement between said valve seats and comprising a plurality of valve disc members having outer surfaces for contact with said valve seats and a member intermediate said valve disc members having upper and lower wedge surface means cooperating with at least one of said disc members for effecting expansion of said valve assembly against said valve seats in open and closed positions at substantially each extremity of travel thereof, said intermediate member extending flush and in line with the outer surface of at least one of said valve disc members for contact with at least one of said valve seats in substantially the open expanded condition of the valve assembly, actuating means for effecting said reciprocal movement of the valve assembly, stop means and abutment surfaces therefor cooperating predeterminately with the said intermediate member and with the said wedge surfaces of the valve disc members to effect the said expanded condition of the valve assembly, leaf-like resilient means supporting and positioning said intermediate member and connecting at one end limit thereof with at least one of said valve disc members during substantially the entire travel of the valve assembly between the end limits of reciprocal movement thereof to prevent substantial expansion of the valve assembly during such movement, alignment means on an outer surface portion of the said intermediate member for maintaining the said resilient means in said connection with the valve disc member, the said resilient means transversely spanning said intermediate member and a portion of the valve disc member to effect said connection.

4. In a valve having a body with spaced valve seats, an expansible valve assembly reciprocally mounted for movement between said valve seats and comprising a plurality of valve disc members having outer surfaces for contact with said valve seats and a member intermediate said valve disc members having upper and lower wedge surface means cooperating with at least one of said disc members for effecting expansion of said valve assembly against said valve seats in open and closed positions at substantially each extremity of travel thereof, said intermediate member extending flush and in line with the outer surface of at least one of said valve disc members for contact with at least one of said valve seats in substantially the open expanded condition of the valve assembly, actuating means for reciprocally moving the said valve assembly, stop means and abutment surfaces therefor predeterminately cooperating with the said intermediate member to effect said expansion of the valve assembly, curved elongated resilient means spanning and engaging said intermediate member, the said resilient means at an end limit thereof abutting against an inner surface of the said valve disc members during substantially the entire travel of the valve assembly between the end limits of reciprocal movement thereof, the curvature of said resilient means being reduced upon predetermined relative movement of the said intermediate member, said relative movement between said latter member and said valve disc members occurring at an end limit of travel of the valve disc members whereby to effect said expansion of the said valve assembly at this stage of valve disc member travel.

5. In a valve having a body with spaced apart parallel valve seats, an expansible valve assembly reciprocally mounted for movement between said valve seats and comprising a plurality of valve disc members having outer surfaces for seating contact with said valve seats and suitably recessed on oppositely disposed inwardly facing surfaces, a wedge member intermediate said valve disc members having upper and lower wedge surface means inclined to valve assembly travel and cooperating with at least one of said valve disc members for effecting expansion of said valve assembly against said valve seats in open and closed positions at substantially each extremity of valve assembly travel, said intermediate member having surface means opposite said upper wedge surface means extending in the direction of valve assembly travel for nonwedging sliding engagement with one of said valve disc members normal to said expansion, said intermediate member having a lower portion extending flush and in line with the outer seating surface of said partly extending valve disc member thereabove for seating contact with one of said valve seats at substantially the open valve condition of the valve assembly, means for actuating the said valve assembly, stop means with abutment surfaces therefor cooperating with said wedge member for said expansion of the valve assembly, normally bowed resilient means carried by the said intermediate member and having end limits received within said recesses on the oppositely disposed inwardly facing surfaces of the said valve disc members thereby to define the curvature of the said bowed resilient means by the spacing between said recesses.

6. In a valve having a housing including a valve chamber and a pair of fluid passages communicating transversely therewith from opposite sides and provided with spaced flat parallel valve seats around the inner termini of said fluid passages, valve stem means extending into said valve chamber at one end thereof, an expansible valve assembly within said valve chamber actuated by said stem means comprising a pair of closure members engaged by said stem means for unitary reciprocal movement thereof and having flat parallel outer surfaces for seating contact with said valve seats and a member intermediate said closure members having reciprocal movement therewith, said intermediate member having flat face means on opposite sides thereof which are inclined and parallel respectively to the reciprocal valve assembly travel, said closure members having flat inner face means which are inclined and parallel respectively to valve assembly travel for engagement by said inclined and parallel face means of said intermediate member in transverse force imparting relationship at substantially one of the extremities of valve assembly travel to spread said closure members transversely against said valve seats in expanded closed valve condition, the closure member which is parallel on the inner side being substantially a flat plate-like member of substantially uniform thickness except for that portion for engagement with said valve stem means, stop means and abutment surfaces therefor in the valve cooperating with the said intermediate member to effect the expansion of said valve assembly, elongated flexible means extending between the inner oppositely disposed surfaces of the said valve disc members, the said flexible means being mounted on the said intermediate member to position the said latter member predeterminately relative to the said valve disc members.

References Cited in the file of this patent

UNITED STATES PATENTS

| | | |
|---|---|---|
| 680,714 | Jefferson | Aug. 20, 1901 |
| 1,023,955 | North | Apr. 23, 1912 |
| 1,492,234 | Arnold | Apr. 29, 1924 |
| 1,803,884 | Bohnnhardt | Mar. 5, 1931 |
| 2,031,372 | Kiesel | Feb. 18, 1936 |
| 2,150,254 | Sorensen | Mar. 14, 1939 |
| 2,230,600 | Olson | Feb. 4, 1941 |
| 2,479,124 | Laurent | Aug. 16, 1949 |
| 2,502,689 | Yant | Apr. 4, 1950 |
| 2,504,924 | Fennema | Apr. 18, 1950 |
| 2,583,512 | Laurent | Jan. 22, 1952 |

FOREIGN PATENTS

| | | |
|---|---|---|
| 556,652 | Germany | of 1932 |
| 610,965 | Germany | of 1935 |